United States Patent [19]

Shaffer et al.

[11] Patent Number: 4,470,569

[45] Date of Patent: Sep. 11, 1984

[54] LOCKING, REDUNDANT SLAT DRIVE MECHANISM

[75] Inventors: James R. Shaffer, Costa Mesa; Louis T. Kramer, Long Beach, both of Calif.

[73] Assignee: McDonnell Douglas Corporation, Long Beach, Calif.

[21] Appl. No.: 334,528

[22] Filed: Dec. 28, 1981

[51] Int. Cl.³ .............................................. B64C 3/50
[52] U.S. Cl. .................................... 244/214; 244/213
[58] Field of Search ............... 244/213, 214, 215, 216, 244/218, 219

[56] References Cited

U.S. PATENT DOCUMENTS

| | | | |
|---|---|---|---|
| 1,653,903 | 12/1927 | Hall | 244/218 |
| 2,218,114 | 10/1940 | Kunze | 244/216 |
| 2,282,516 | 5/1942 | Gropler et al. | 244/216 |
| 2,298,264 | 10/1942 | Czurles et al. | |
| 3,486,720 | 12/1969 | Seglem et al. | 244/214 |

FOREIGN PATENT DOCUMENTS 2073681 10/1981 United Kingdom ............... 244/213

OTHER PUBLICATIONS

"Messerschmitt Me110C Flight Control Details" *Aero Digest*, Feb. 15, 1944, pp. 124–125.

*Primary Examiner*—Trygve M. Blix
*Assistant Examiner*—Rodney Corl
*Attorney, Agent, or Firm*—Paul T. Loef; George W. Finch; Donald L. Royer

[57] ABSTRACT

A slat system in which the slats are supported on tracks and the slats are actuated by a simple bell crank linkage oriented so that its plane of motion is parallel to the wing chord reference plane. The mechanism retracts to a collapsed over-center position and extends to an over-center position so as to lock the slat into the retract or extend positions. Each slat segment is driven by two identical mechanisms tied together by a synchronization link which provides redundancy. Either actuator can drive the surface alone, as the second actuator is driven through the synchronization lever, in case of power loss to the second actuator.

7 Claims, 8 Drawing Figures

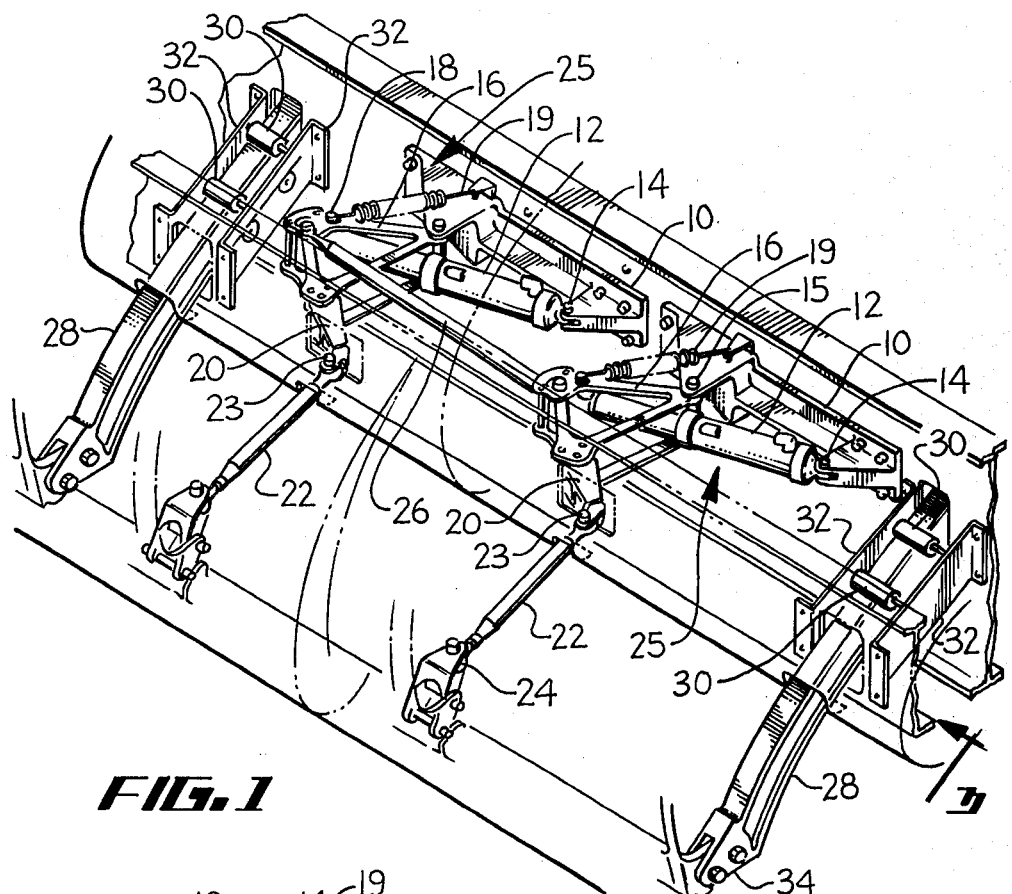
FIG. 1
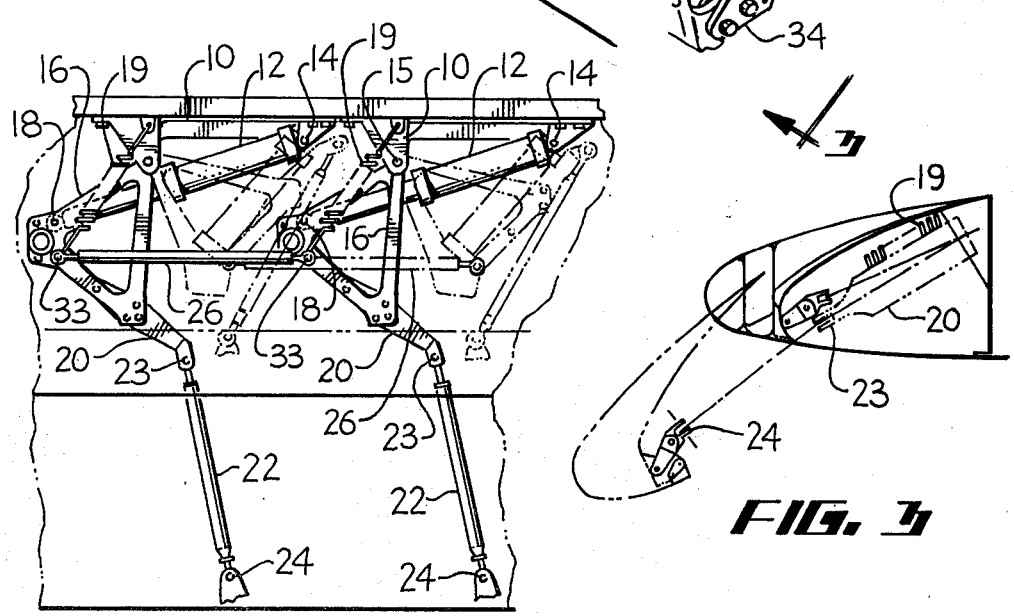
FIG. 2
FIG. 3

LOCKING, REDUNDANT SLAT DRIVE MECHANISM

BACKGROUND OF THE INVENTION

This invention is directed to a wing leading edge flap and, more particularly to the mechanism for actuating the leading edge flap.

The aerodynamic design of modern aircraft wings is a compromise between many conflicting requirements, thus limiting near optimum aerodynamic performance to a small portion of their flight envelopes. Obviously, great emphasis must be placed on cruise configuration as this is the regime most frequently experienced. However, modern wings must be configured to permit variation in the airfoil geometry either in flight or on the ground to improve aerodynamic performance during other portions of the flight regime. Leading edge flaps or slats are common devices, which are made to extend from the leading edge of the wing, to improve lift coefficients during landing and takeoff operations.

Current commercial and military transport aircraft employ slat or leading edge flap systems supported by either track systems or linkages and driven by alternate schemes, including cable systems, torque tubes, or direct actuator drives, either hydraulic cylinders or ball screws. Most track systems drive the track itself, which makes for a complex and costly track system. Invariably, in either system, the motion of the drive system is oriented in a plane perpendicular to the wing chord plane. One exception to this generality is an early wing slat system disclosed in U.S. Pat. No. 2,298,264, issued to Czurles et al. However, Czurles teaches a direct drive of the track by a chain and sprocket system rather than a linkage system.

Where a linkage drive system is employed and its motion is oriented in a plane perpendicular to the wing chord plane it either makes for a complex linkage system involving several combined linkages or it requires that the linkage extends or protrudes from the wing envelope in order to achieve the necessary mechanical advantage. This is true because the wings are thin and taper from the wing root to tip.

Known flight characteristics as a result of asymmetric slat conditions make it imperative that the slat system positively lock in the extend or retract position, and every emphasis must be placed on the design to avoid a condition which permits an asymmetric slat condition to occur.

In certain aircraft, it is necessary to accommodate leading edge boundary layer control equipment, e.g. de-icing ducts, fuel tanks, or some other mechanism, in the leading edge wing structure forward of the wing front spar. It is an object of this invention to provide a slat actuating system which provides space forward of the wing front spar for other systems to pass by the slat activating mechanism. It is a further object of this invention to maintain the operating envelope of the actuating mechanism of the slat system within the conventional wing envelope. It is yet another object of this invention to provide a slat actuating mechanism which locks the slats in the fully extended position and prevents the slat from extending when the activating power is not applied to the mechanism. The final object of the invention is to provide a redundant mechanical drive characterized by light weight, easy maintenance, and improved simplicity.

SUMMARY OF THE PRESENT INVENTION

In summary, the slat drive mechanism of this invention accomplishes the above objects and overcomes the disadvantages of the prior devices by providing a slat system in which the slats are supported on tracks and the slats are actuated by a simple bell crank linkage oriented so that its plane of motion is parallel to the wing chord reference plane. The mechanism retracts to a collapsed over-center position and extends to an over-center position so as to lock the slat into the full retract or full extend positions. Each slat segment is driven by two identical mechanisms tied together by a synchronization link which provides redundancy. Either actuator can drive the surface alone, as the second actuator is driven through the synchronization lever, in case of power loss to the second actuator. Except for the push rods connecting between the actuation mechanism and the slat, the actuation mechanism is contained between the forward intercostal and the front wing spar.

The overall slat system provides for slat support on a very simple track system which permits slat rotation about the theoretical hinge line as determined by the center of curvature of the tracks. The track support, in combination with the simple actuation system, oriented with its motion plane parallel to the wing reference plane, extends and retracts the slat on rollers supported on the circular arc track.

BRIEF DESCRIPTION OF THE DRAWINGS

With reference to the drawings, wherein like reference numerals designate like portions of the invention:

FIG. 1 is a perspective view of an entire slat segment shown in the extended position in relationship to the wing front spar;

FIG. 2 is a plan view of the perspective shown in FIG. 1;

FIG. 3 is a typical section view of the wing leading edge, showing the slat in both the extend and retract position, cut at 3—3 in FIG. 1;

DESCRIPTION OF THE PREFERRED EMBODIMENTS

Figure 4:
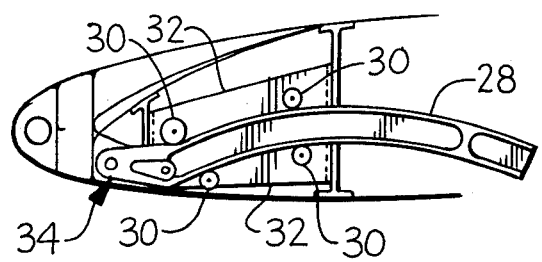
FIG. 4 is a partial view of a retracted slat showing the idler track and rollers attached to the flap.
Figure 7:
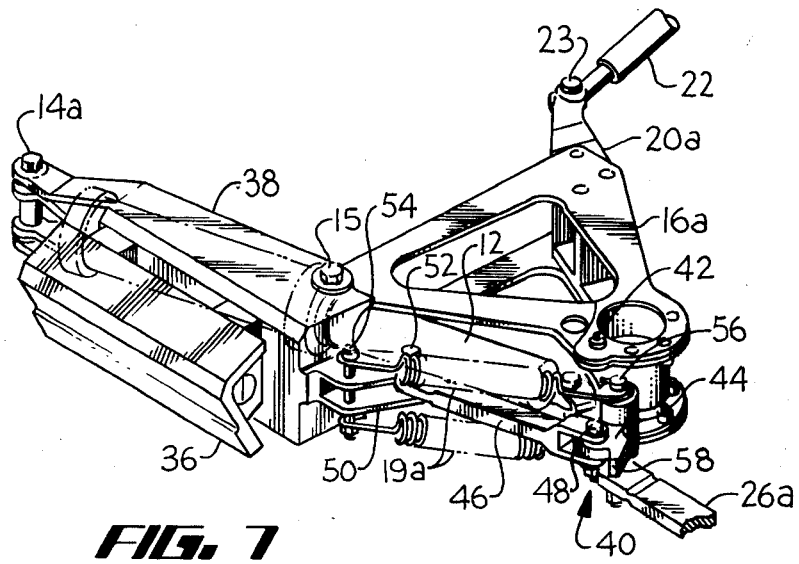
FIGS. 7 and 8 are partial enlarged perspective views of the actuator and linkage portion of FIGS. 5 and 6 in the extend and retract positions to better illustrate the over-center locking arrangements.
Figure 8:
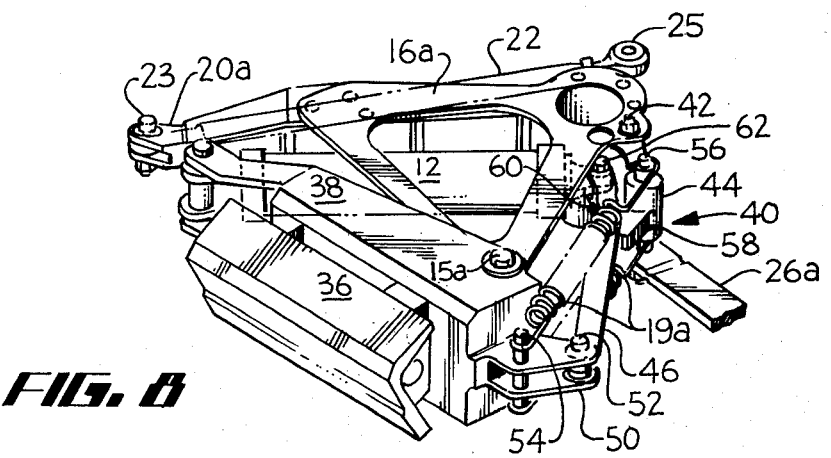
Figure 5:
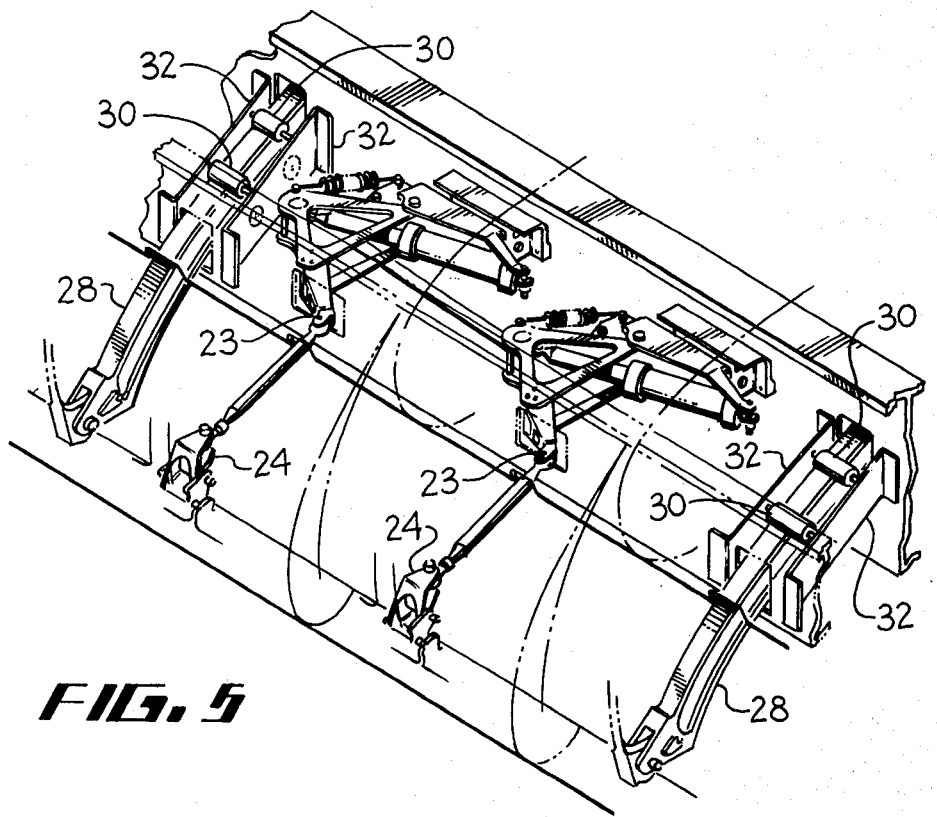
FIG. 5 is a perspective view of the embodiment providing overcenter locks in both the full retract and extend flap positions.

Mounted to the forward side of the front spar is the base fitting 10 which supports the actuator 12 at the clevis attachment 14. The actuator is shown as a hydraulic cylinder, however, any suitable linear actuator would be satisfactory. At the other end of the base fitting 10, pivotally mounted at 15, is the bell crank 16. The piston of the actuator 12 attaches to the bell crank 16 at 18. The load end 20 of the bell crank 16 is attached to the push rod 22 at 23, which is in turn connected to the leading edge slat at 24. This entire assembly represents the mechanical actuation system for the slat which operates in a plane generally parallel to the wing chord reference plane. Both ends of the push rod 22 terminate in spherical ball ends or self-aligning bearings to accommodate any out-of-plane rotation which may occur. A biasing spring 19 is shown connected between the wing structure and a point on the bell crank 16 near the pin 33 connecting the synchronization link 26 to the bell crank 16. The spring biases the linkage system past center when the slat is in the full extend position. The linkage system is past center, and thus locked, when the pin connection point 23 is rotated past a line drawn between the center of connection at 15 and the center of connection of the push rod 22 to the slat, shown as point 24. The spring also biases the linkage when the slat is in the retracted position.

Two actuator assemblies 25 are used to drive a single slat segment. The two actuator assemblies 25 are connected by a synchronization link 26 which is pin connected at both ends. The synchronization link 26 provides a redundancy between the two actuator assemblies inasmuch as one actuator 12 can drive both bell cranks 16, through the synchronization link 26, in the event of a loss of one actuator. Further redundancy can be supplied by driving the two actuators 12 from independent sources such as two different hydraulic systems.

The slat segment is supported by a pair of slat tracks 28, each of which in turn is supported by four rollers 30. The rollers 30 which support the rails or tracks 28 are, in turn, supported by structure 32 which spans between the intercostal and the forward side of the main spar. While four rollers are necessary, only two diagonally opposed rollers experience most of the load at any given time. One end of the track 28 is shown attached to the slat segment by a clevis 34. Since only two diagonal rollers will react the load at any given time, the track rotates about, or very close to, the true center of the arc, forming the shape of the track 28.

An alternative and preferred embodiment of the slat actuation system is shown in FIGS. 5, 6, 7, and 8. In this embodiment, the base support to the spar has changed, however, this is not significant as an intermediate offset clip 36 is used to attach to the spar. This change was made for maintenance purposes to avoid installing and reinstalling fasteners directly into the spar as the fasteners must be sealed as fuel is contained on on side of the spar. Attached to the outside clip 36 is the support bracket 38 which provides the same hinge points 14, for the actuator 12 and 15 for the bell crank 16a as the alternate embodiment. The bell crank 16a has been modified to pivotally support one end of the hinged lock link assembly 40 at point 42. The hinged lock link assembly 40 consists of a short link 44 and a long link 46 which are pin connected at 48. The other end of the long link 46 is pivotally attached to the clevis portion 50 of the support bracket 38 by a pin 52. The pin 54 is provided in the same clevis 50 to accommodate one end of the pair of tension springs 19a. The other end of the tension springs 19a are supported by the pin 56 provided in the short link 44.

Short link 44 is provided with a clevis 60 at the side of the link which accommodates the rod end of the actuator 12 with the pin 62. The lower end of the pin 56 and the short link 44 support the synchronization link 26a, the other end of which, in turn, attaches to a similar spot on the next linkage assembly to complete one slat drive mechanism. The synchronization link 26a, as in the prior embodiment, coordinates the two mechanisms and further provides a redundancy in the event that one actuator fails the remaining actuator will drive both mechanisms through the synchronization link 26a.

Figure 6:
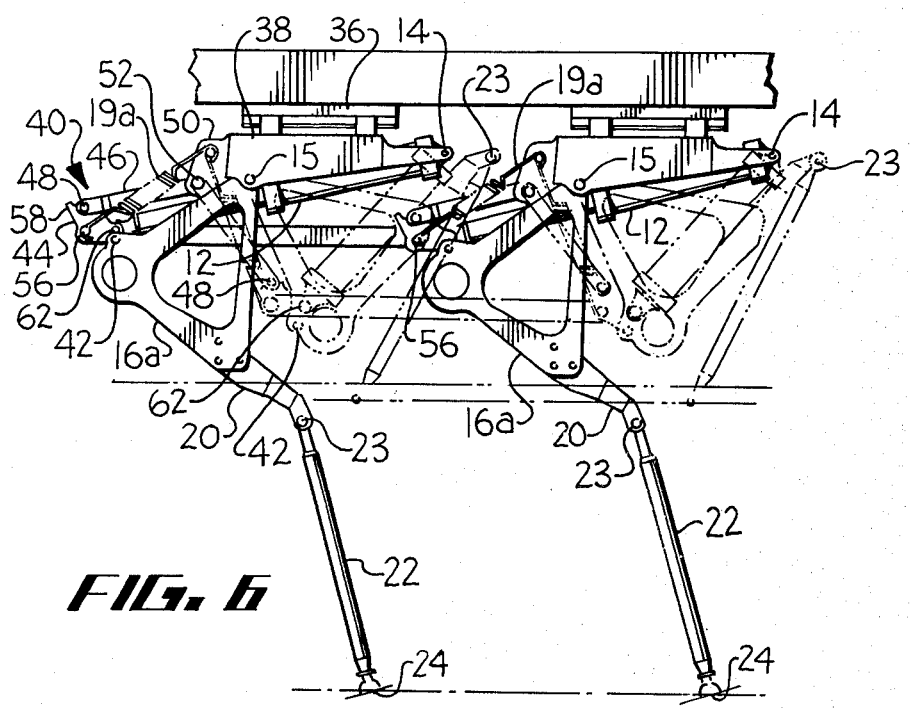
FIG. 6 is a plan view of the perspective shown in FIG. 5.

The hinged lock link assembly 40 serves to lock the mechanism in the retracted position in the case of a system failure like loss of hydraulics to the actuator 12. The danger that is being avoided by the lock link is inadvertent extension of the slat on one wing only, due to air loads, after an inadvertent failure, e.g. loss of hydraulics to the actuator 12 by severing of the lines so that the actuator will not function in any fashion, even as a brake. By examining FIG. 8 and the retracted position in FIG. 6, shown in reference lines, we can see the function of the over-center lock link assembly 40.

The lock link assembly is hinged between the support 38 at point 52 and the bell crank 16a at point 42. With the linkage in the retracted position, it can be seen that the hinge point 48 of the overcenter lock link assembly 40 is past a line drawn between the two support hinge points 42 and 52. In fact, the linkage is stopped from going further past center by the stop 58. With the linkage in the retracted position, a pull on the end of the push rod 22 pulls on the of the bell crank at 23 and since the bell crank is pivotally supported at the pin 15, tends to cause the bell crank to rotate about the point 15 causing the over-center linkage assembly 40 to go further over center until it reaches the stop 58. Extension of the actuator 12, of course, acts to break the lock link assembly 40 in the opposite direction rotating the link about the pin 48 in normal actuation. As discussed, in the prior embodiment, when the actuator is in the extend position, the mechanism is in the position shown in FIG. 7 and the solid lines of FIG. 6. The point 23 lies over center, or to the left, of a line drawn between the hinge points 15 and 24. If a force were applied, externally, so as to retract the slat, the force acts to rotate the bell crank 16a about the point 15 in a clockwise direction and is restrained either by the extended actuator 12, thereby locking the mechanism in the extended position. Hence, only actuation of the actuator 12 either in extension or retraction will either extend or retract the mechanism.

It may thus be seen that the slat support system, in combination with the slat actuation system depicted in the preferred embodiment of this invention, serves to solve the indicated problems as well as accomplish the objectives noted. This invention is not limited to the embodiment disclosed above. All changes and modification thereof not constituting deviations from the spirit and scope of this invention are intended to be included.

What is claimed is:

1. An aircraft wing having internal structure, a leading edge slat support and actuation system for extending the slat segments from a stowed position to an extend position, comprising:
   a pair of tracks mounted in parallel, spanwise spaced relationship for chordwise movement and attached at the leading end to said slat segment;
   a base fitting attached to said wing structure;
   a bell crank pivotally attached at one end to said base fitting;
   a push rod pivotally attached at a point at the free end of said bell crank and connected to said slat segment so that in the full extend position of said slat, the center of said point attaching said push rod to said bell crank is positioned past a line drawn between the center of the attach point of said push rod to said slat and the center of the attach point of said bell crank to said base fitting, whereby said actuation system for extending the slat segments is in an over-center position to mechanically lock said actuation system in the extend position;

a linkage assembly formed by a first link and second link pivotally attached to form an intermediate hinge and said intermediately hinged first and second links pivotally attached between said bell crank and said base fitting so that when said slat system is in the full retract position said intermediate hinge point lies on the side in the direction of further retraction of said slat mechanism from a line drawn between the two attach points of said intermediately hinged first and second links to said bell crank and said base fitting whereby said intermediately hinged first and second links are in an over-center position to mechanically lock said mechanism in the retract position; and an actuator connected between said base fitting and said bell crank whereby extension of said actuator rotates said bell crank, extending said push rod which is attached to said slat segment, causing said slat segment to translate on said track and having over-center locking provisions in both retract and extend positions.

2. The aircraft wing leading edge slat system of claim 1 further comprising a biasing means to bias said intermediately hinged first and second links in said over-center position.

3. The aircraft wing leading edge slat system of claim 2 wherein there are at least two essentially similar linkage mechanisms spaced between said pair of tracks and said at least two linkage mechanisms are tied together by a synchronizing link whereby powered actuation of one linkage mechanism drives all remaining linkage mechanisms even though the remaining linkage mechanisms have lost their power sources.

4. The aircraft wing leading edge slat system of claim 3 wherein each of said actuators driving each of said linkage mechanisms is powered from independent sources to provide further redundancy.

5. The aircraft wing leading edge slat system of claim 1 or 2 wherein said push rod is provided with self-aligning means at both ends and means to adjust the length of said push rod.

6. The aircraft wing leading edge slat system of claim 1 wherein said pair of tracks supporting said slat segments are curved.

7. The aircraft wing leading edge slat system of claim 1 further comprising a stop to limit the travel of said hinged first and second links in the over-center position.

* * * * *